Patented Nov. 27, 1951

2,576,434

UNITED STATES PATENT OFFICE 2,576,434

MANUFACTURE OF TITANIUM PIGMENTS

Robert William Ancrum, Stockton-on-Tees, England, assignor to National Lead Company, New York, N. Y., a corporation of New Jersey No Drawing. Application July 17, 1945, Serial No. 605,627. In Great Britain July 27, 1943

4 Claims. (Cl. 106—300)

This invention relates to improvements in the manufacture of finely divided rutile titanium dioxide pigments; it has particular reference to methods for improving the brightness and color tone of such pigments.

This application is a continuation-in-part of my copending application, Serial No. 522,833, filed February 17, 1944, and now abandoned.

Titanium dioxide occurs in three crystalline modifications; namely, anatase, brookite and rutile, having refractive indices of 2.52, 2.64 and 2.71 respectively. Commercial titanium dioxide pigments are usually in the anatase crystalline form and such pigments are generally inferior in tinting strength to rutile pigments of similar particle size, by reason of the inferior refractive index of anatase.

Various methods have been proposed for the production of finely divided rutile pigments. For example, titanium tetrachloride, usually in the form of an aqueous solution, may be hydrolyzed in a variety of ways to give a precipitate of hydrous titanium dioxide which on calcination produces a finely divided rutile pigment. Titanium sulfate solutions may also be hydrolyzed under certain conditions to give products which give rise to finely divided rutile directly on calcination. Two such methods are described in British Specifications No. 513,867 and No. 542,579. In British Patent 513,867, the method consists in hydrolysis of the solution containing a titanium compound using a nucleating sol of a titanium compound having univalent anions and which is obtained directly from titanium salts with univalent anions and having been subjected to a heat treatment preferably to about 70 to 90° C. Hydrolysis carried on in the presence of such a sol produces a hydrolysate which will convert directly to rutile on calcination. British Patent No. 542,579 describes the process in which the hydrolysis is carried on in the presence of a sol produced from titanium hydrate. The titanium hydrate is first precipitated from a titanium salt solution, purified by neutralization and washing to remove polyvalent anions and then peptized in water using a peptizing agent, the negative ion of which is univalent. The sol is preferably heat treated and then is ready for use as a nucleating agent. Use of this sol in hydrolysis of titanium sulphate solutions also produces a hydrolysate which will directly convert to rutile at normal calcination temperature. The tinting strengths of the products obtained from such methods are about 25% to 30% in excess of the values obtained for commercial anatase pigments. Usually, however, such pigments suffer from certain deficiencies in brightness and tone. The present invention constitutes a simple and effective method for improving the brightness and tone of rutile pigments obtained upon calcination of hydrolysates derived from titanium sulfate solutions.

The present invention, in its broadest aspects, contemplates the addition of minor amounts of compounds of certain elements of group IV of the periodic classification of elements to hydrous titanium oxide derived from titanium sulfate solutions which upon calcination under normal conditions of temperature yields directly rutile titanium dioxide.

The particular elements of group IV, the compounds of which are especially suited for the practice of the invention are: silicon, zirconium and thorium. The amount of such compounds necessary to obtain the desired improved results varies somewhat; for example, with silicon compounds the amount may vary between about 0.02% to about 0.5%, calculated as $SiO_2$; for zirconium from about 0.1% to about 2.0% calculated as $ZrO_2$; and, for thorium, from about 0.05% to about 1.0%, calculated as $ThO_2$, all based on the $TiO_2$ content of the hydrous titanium oxide. The elements may be added to the hydrous titanium oxide in the form of their soluble or insoluble compounds; for example, $SiO_2$ may be added in the form of an alkali metal silicate or the $SiO_2$ may be precipitated from an alkali metal silicate, washed and then added to the hydrous titanium oxide. Zirconium may be added as $ZrO_2$ or as a soluble Zr salt and likewise with thorium. A mixture of two or more of the compounds may be employed if desired. The addition of the desired compounds to the hydrous titanium oxide may be effected in any convenient manner which results in an intimate and uniform admixture. Conventional conditioning agents such as potassium carbonate may be used in combination with the compounds of the elements of the present invention, but the quantities should not be so large as to inhibit rutilization.

After the admixture of the compounds of silicon, zirconium and/or thorium to the hydrous titanium oxide the mixture is calcined under normal temperature conditions, i. e. below 1000° C. and more particularly at temperatures between 800° C. and 1000° C.

Although, as has been pointed out above, the present invention is adapted to the treatment of hydrolysates obtained according to the methods described in British Specifications No. 513,867 and No. 542,579, it is not limited to the use of such hydrolysates but is applicable to the treatment of any hydrolysates derived from titanium sulfate solutions which yield rutile titanium dioxide upon calcination under normal conditions above defined.

The process of the invention may be illustrated by the following examples:

*Example I*

Hydrous $TiO_2$ pulp made by the process described in British Specification No. 513,867, i. e. in a form which would give on calcination a finely divided rutile, was divided into two portions. To one portion was added potassium carbonate in an amount corresponding to 0.25% of $K_2O$ calculated on the $TiO_2$. To a second portion, potassium silicate was added in an amount corresponding with 0.25% $K_2O$ and 0.18% $SiO_2$. Both samples were dried and calcined for 2 hours at 920° C. The calcined products after the usual milling treatment were both in the rutile form but showed a considerable difference in tone and brightness, the sample containing $SiO_2$, being superior in these respects.

*Example II*

Hydrous $TiO_2$ pulp, as used in Example I, was treated with potassium carbonate in an amount corresponding to 0.25% $K_2O$, calculated on the $TiO_2$. The pulp was divided into two parts, to one of which was added an amount of thorium nitrate corresponding with 0.5% $ThO_2$ calculated on the $TiO_2$. Both samples were dried and calcined for 2 hours at 920° C. The calcined products after milling were in the rutile form but showed a considerable difference in tone and brightness, the thorium-treated sample being superior in these respects.

Titanium pigments obtained according to the present invention are of the rutile type and possess improved brightness and color tone. They are further characterized as possessing a tinting strength, determined by the well-known Reynolds method, of at least 1400 as compared with a value of about 1250, similarly determined for normal anatase pigments calcined and milled in the same manner.

The foregoing description with examples discloses several embodiments of the present invention. However, it will be understood that the invention is susceptible of further variations within the scope of the appended claims.

I claim:

1. Process for the manufacture of rutile titanium dioxide pigments having improved brightness and tone which comprises adding to a hydrolysate of hydrous titanium dioxide derived from a titanium sulphate solution, which hydrolysate on calcination yields directly rutile titanium dioxide, a compound of silicon selected from the group consisting of alkali metal silicates and silicon dioxide in proportion between 0.02% and 0.5% calculated as $SiO_2$, and calcining the mixture at a temperature of between about 800° C. to 1000° C. to form substantially 100% rutile.

2. Process for the manufacture of rutile titanium dioxide pigments having improved brightness and tone which comprises adding to a hydrolysate of hydrous titanium dioxide derived from a titanium sulphate solution, which hydrolysate on calcination yields directly rutile titanium oxide, a compound of silicon selected from the group consisting of alkali metal silicates and silicon dioxide in proportions of between 0.02% and 0.5%, calculated as $SiO_2$ and calcining the mixture at a temperature of about 900° C. to 925° C. for about 2 hours.

3. Method according to claim 1 wherein the added compound is a potassium silicate.

4. Rutile titanium dioxide pigment having improved brightness and tone containing an added compound of silicon selected from the group consisting of alkali metal silicates and silicon dioxide in proportions of between 0.02% and 0.5% calculated at $SiO_2$.

ROBERT WILLIAM ANCRUM.

REFERENCES CITED

The following references are of record in the file of this patent:

UNITED STATES PATENTS

| Number | Name | Date |
|---|---|---|
| 2,166,082 | Washburn | July 11, 1939 |
| 2,290,539 | Cole | July 21, 1942 |
| 2,369,246 | Peterson | Feb. 13, 1945 |

FOREIGN PATENTS

| Number | Country | Date |
|---|---|---|
| 499,153 | Great Britain | Jan. 19, 1939 |